US 9,411,594 B2

(12) United States Patent
Tsuji (10) Patent No.: US 9,411,594 B2
(45) Date of Patent: Aug. 9, 2016

(54) CLOCK DATA RECOVERY CIRCUIT AND CLOCK DATA RECOVERY METHOD

(75) Inventor: Masayuki Tsuji, Fussa (JP)

(73) Assignee: Cypress Semiconductor Corporation, San Jose, CA (US)

( * ) Notice: Subject to any disclaimer, the term of this patent is extended or adjusted under 35 U.S.C. 154(b) by 781 days.

(21) Appl. No.: 13/589,354

(22) Filed: Aug. 20, 2012

(65) Prior Publication Data

US 2013/0054941 A1 Feb. 28, 2013

(30) Foreign Application Priority Data

Aug. 22, 2011 (JP) ................................. 2011-180456

(51) Int. Cl.
*G06F 9/30* (2006.01)
*G06F 7/38* (2006.01)
*G06F 9/38* (2006.01)

(52) U.S. Cl.
CPC ........ *G06F 9/30196* (2013.01); *G06F 9/30181* (2013.01); *G06F 9/3822* (2013.01); *G06F 9/3861* (2013.01); *G06F 9/30* (2013.01); *G06F 9/30003* (2013.01)

(58) Field of Classification Search
None
See application file for complete search history.

(56) References Cited

U.S. PATENT DOCUMENTS

| | | | | |
|---|---|---|---|---|
| 5,335,331 A | * | 8/1994 | Murao et al. | 712/213 |
| 5,499,348 A | * | 3/1996 | Araki et al. | 712/207 |
| 8,049,760 B2 | * | 11/2011 | Jiao et al. | 345/505 |
| 2001/0014939 A1 | * | 8/2001 | Munson | G06F 9/3824 712/218 |
| 2002/0066004 A1 | | 5/2002 | Nevill et al. | |
| 2003/0154347 A1 | * | 8/2003 | Ma | G11C 8/16 711/131 |
| 2004/0172519 A1 | | 9/2004 | Nakajima | |
| 2004/0236927 A1 | * | 11/2004 | Irie | G06F 9/30134 712/209 |
| 2005/0037801 A1 | * | 2/2005 | Moore | 455/550.1 |
| 2008/0218203 A1 | * | 9/2008 | Arriens et al. | 326/38 |
| 2008/0270759 A1 | | 10/2008 | Im | |

FOREIGN PATENT DOCUMENTS

| | | |
|---|---|---|
| JP | S61267833 A | 11/1968 |
| JP | H04076626 A | 3/1992 |
| JP | 5-88885 | 4/1993 |
| JP | 7-13758 | 1/1995 |
| JP | 11-212804 | 8/1999 |
| JP | 2000137619 A | 5/2000 |
| JP | 2001-184209 | 7/2001 |

(Continued)

OTHER PUBLICATIONS

Extended European Search Report issued Dec. 17, 2012 in corresponding European Patent Application No. 12180833.1.

(Continued)

*Primary Examiner* — Hyun Nam (57) ABSTRACT

A processor includes: an arithmetic unit configured to execute instructions; an instruction decode part configured to decode the instructions executed in the arithmetic unit and to output opcodes; and an interrupt register configured to receive interrupt signals, wherein the instruction decode part includes an instruction code map that stores the opcodes in correspondence to instructions and outputs the opcodes in accordance with the instructions inputted, and the instruction code map stores a plurality of sets of opcodes to be output as switch opcodes corresponding to additional instructions, the additional instructions are a part of the instructions, and switches the sets of the switch opcodes in accordance with the interrupt signal.

8 Claims, 7 Drawing Sheets

(56) References Cited

FOREIGN PATENT DOCUMENTS

| | | |
|---|---|---|
| JP | 2013539883 | 8/2003 |
| JP | 2004-511044 | 4/2004 |
| JP | 2004259143 A | 9/2004 |
| JP | 2008129851 A | 6/2008 |
| JP | 2009181312 A | 8/2009 |
| WO | 2007/027025 | 3/2007 |

OTHER PUBLICATIONS

JP Office Action for Japanese Application No. 2011-180456 dated Apr. 30, 2015; 10 pages.
JP Office Action for Japanese Application No. 2011-180456 dated Oct. 27, 2015; 1 page.
SIPO Office Action for Chinese Application No. 201210310346.2 dated Jun. 2, 2015; 3 pages.
SIPO Office Action for Chinese Application No. 201210310346.2 dated Nov. 20, 2015; 2 pages.

* cited by examiner

FIG.4A
INTERRUPT NUMBER 1 (TIMER PROCESSING HANDLER)

FIG.4B
INTERRUPT NUMBER 2 (CLOCK PROCESSING HANDLER)

FIG.4C
INTERRUPT NUMBER 3 (WATCHDOG RESET PROCESSING HANDLER)

FIG.4D
INTERRUPT NUMBER 4 (DMA TRANSFER HANDLER)

FIG.6

```
volatile struct {
  short reserved0;
  unsigned char reserved1:3;
  unsigned char start:1;
  unsigned char status:2;
} timer1_reg;

int read_1bit(){ return timer1_reg.status; }
```

CLOCK DATA RECOVERY CIRCUIT AND CLOCK DATA RECOVERY METHOD

CROSS-REFERENCE TO RELATED APPLICATION

This application is based upon and claims the benefit of priority of the prior Japanese Patent Application No. 2011-180456, filed on Aug. 22, 2011, the entire contents of which are incorporated herein by reference.

FIELD

The embodiments discussed herein are related to a processor.

BACKGROUND

In recent years, a semiconductor processing device that includes a processor (CPU) is widely used. For example, in an automobile, about 100 semiconductor processing devices are mounted. As such a semiconductor processing device for a specific application, a general-purpose semiconductor processing device is used from the viewpoint of cost. In the actual use of the semiconductor processing device, specialized processing in a specific application is repeatedly performed in many cases and specific instructions are frequently performed. Therefore, a semiconductor processing device that includes a processor to which application-specific instructions are added for each application is used in order to quickly respond to a request to optimize a user application. In such a processor, a method is generally used, in which a dedicated interface is provided for additional instructions and dedicated opcodes are allocated.

Figure 1A:
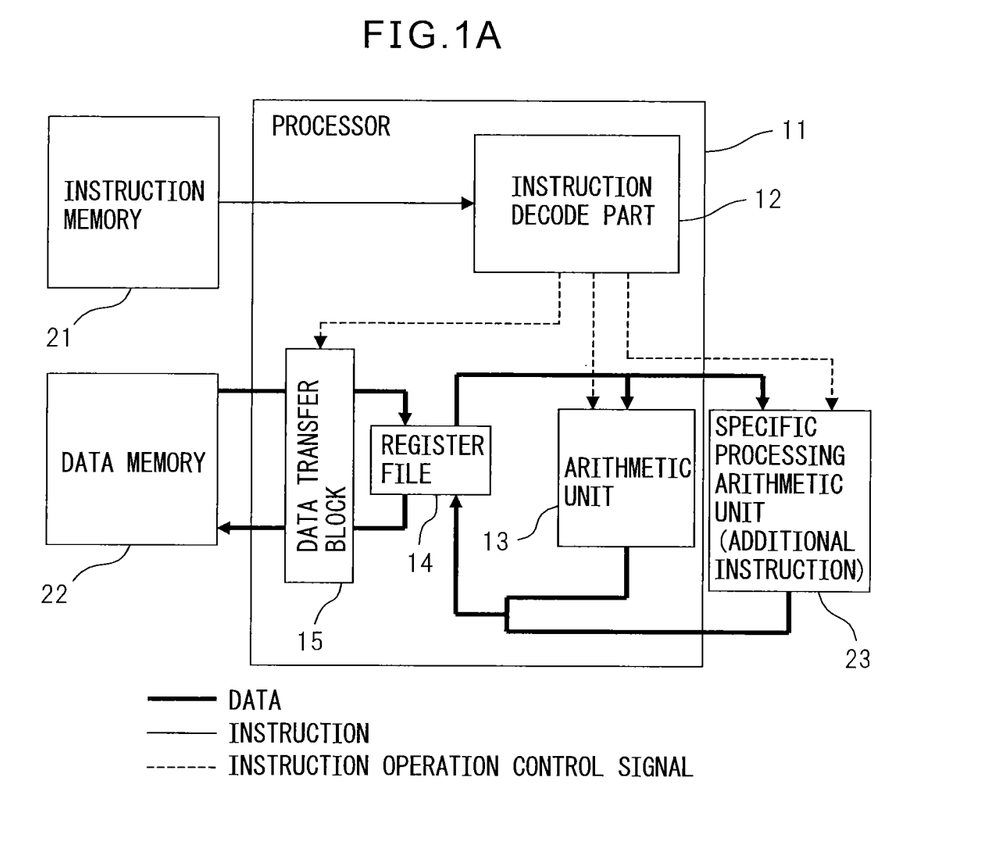
FIG. 1A is configuration diagram of an outline of hardware of a general computer that mounts a processor to which instructions are added.

FIG. 1A is a diagram illustrating a hardware configuration of a computer that includes a processor to which specific instructions are added. Such a computer is realized as a semiconductor processing device and the semiconductor processing device is included in each part. In FIG. 1A, thick arrow lines indicate the flow of data, thin arrow lines indicate the flow of instructions, and broken arrow lines indicate the flow of an instruction operation control signals.

As illustrated in FIG. 1A, a computer has a processor 11, an instruction memory 21, a data memory 22, and a specific processing arithmetic unit 23 that processes additional instructions. The processor 11 has an instruction decode part 12, an arithmetic unit 13, a register file 14, and a data transfer block 15. The instruction decode part 12 fetches instructions read from the instruction memory 21, generates instruction operation control signals (operation codes: opcodes) for execution in the arithmetic unit 13 by decoding the fetched instructions, and outputs the opcodes to the arithmetic unit 13. Further, the instruction decode part 12 sends information of data for executing the instructions to the data transfer block 15. The data transfer block 15 reads data for executing the instructions from the data memory 22 and stores the data in the register file 14. The arithmetic unit 13 processes the data stored in the register file 14 in accordance with the opcodes (there is a case where data is not used) and stores data of the processing results in the register file 14. The data transfer block 15 reads the data of the processing result from the register file 14 and stores the data in the data memory 22. The above is the general operation of the processor.

When the specific processing arithmetic unit 23 processes additional instructions, the specific processing arithmetic unit 23 is connected to the processor 11. The processor 11 has an interface to connect the specific processing arithmetic unit 23. The interface outputs instruction operation control signals (opcodes) to the specific processing arithmetic unit 23 when the instructions decoded by the instruction decode unit 12 are additional instructions and data are input and output between the specific processing arithmetic unit 23 and the register file 14. The portion having the interface and the arithmetic unit 13 is referred to as an arithmetic part. The specific processing arithmetic unit 23 processes the data stored in the register file 14 in accordance with the opcodes corresponding to the additional instructions and stores data of the processing results in the register file 14.

Figure 1B:
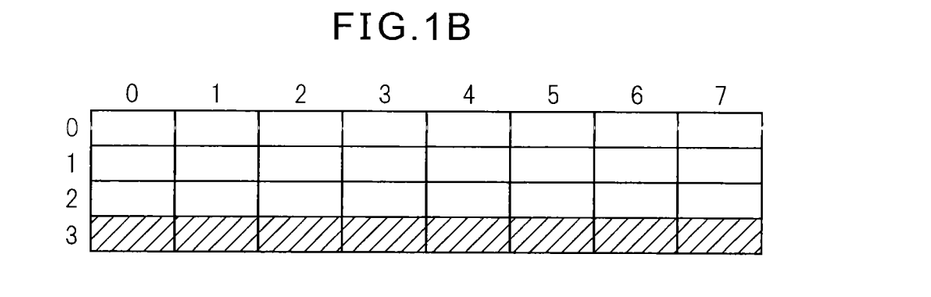
FIG. 1B is a diagram illustrating an example of an instruction code map possessed by the instruction decode part.

FIG. 1B is a diagram illustrating an example of an instruction code map possessed by the instruction decode part 12. The instruction decode part 12 has an instruction code map that stores opcodes in correspondence to instructions and reads and outputs the opcodes corresponding to the input instructions.

FIG. 1B illustrates a 4×8 instruction code map and opcodes are generated for 32 instructions. For example, additional instructions are allocated to 1×8 regions in the fourth row and general instructions executed by the arithmetic unit 13 are allocated to 3×8 regions in the first to third rows.

As illustrated in FIG. 1B, of 32 instruction regions, eight instruction regions are allocated to additional instructions. Therefore, general instructions are limited to 24 and additional instructions are limited to eight. Accordingly, it is difficult to sufficiently define the numbers of the executable general instructions and the executable additional instructions. The small number of instructions causes problems not only when the specific processing arithmetic unit 23 that processes additional instructions is connected to execute the additional instructions but also when the arithmetic unit 13 executes special instructions in addition to basic instructions.

If the instruction code map is extended, the number of executable instructions is increased. However, this requires an increase in the number of bits representing the instruction codes, and therefore, the circuit scale of the processor is increased considerably.

RELATED DOCUMENTS

[Patent Document 1] Japanese Laid Open Patent Document No. H05-88885
[Patent Document 2] Japanese Laid Open Patent Document No. H11-212804
[Patent Document 3] Japanese Laid Open Patent Document No. 2001-184209
[Patent Document 4] Japanese Laid Open Patent Document No. H07-13758
[Patent Document 5] Japanese Laid Open Patent Document No. 2004-511044

SUMMARY

According to an aspect of the embodiments, a processor includes: an arithmetic unit configured to execute instructions; an instruction decode part configured to decode the instructions executed in the arithmetic unit and to output opcodes; and an interrupt register configured to receive interrupt signals, wherein the instruction decode part includes an instruction code map that stores the opcodes in correspondence to instructions and outputs the opcodes in accordance with the instructions inputted, and the instruction code map stores a plurality of sets of opcodes to be output as switch opcodes corresponding to additional instructions, the additional instructions are a part of the instructions, and switches the sets of the switch opcodes in accordance with the interrupt signal.

The object and advantages of the embodiments will be realized and attained by means of the elements and combination particularly pointed out in the claims.

It is to be understood that both the foregoing general description and the following detailed description are exemplary and explanatory and are not restrictive of the invention.

DESCRIPTION OF EMBODIMENTS

Figure 2:
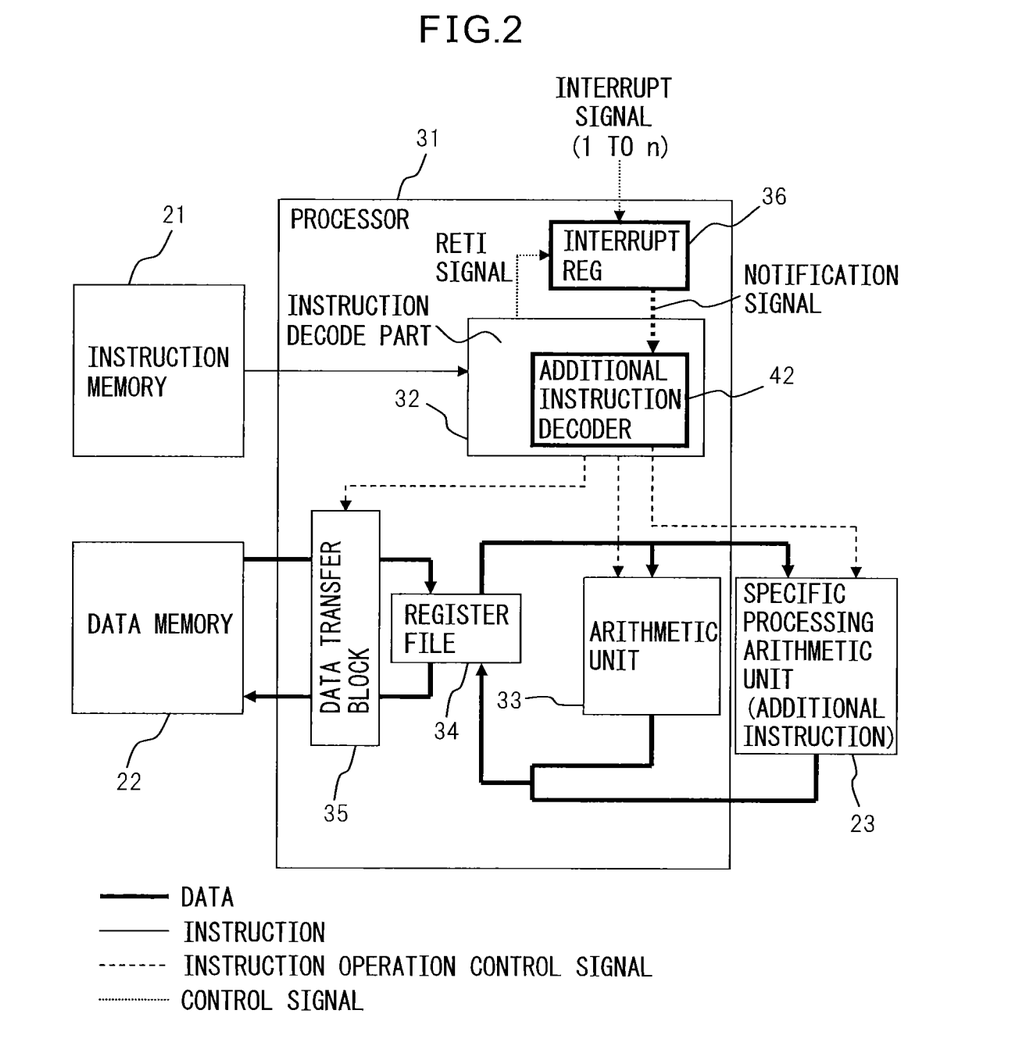
FIG. 2 is a configuration diagram of an outline of hardware of a computer of a first embodiment.

FIG. 2 is a configuration diagram of an outline of hardware of a computer of a first embodiment.

The computer of the first embodiment has a processor 31, the instruction memory 21, the data memory 22, and the specific processing arithmetic unit 23 that processes an additional instruction. The processor 31 has an instruction decode part 32, an arithmetic unit 33, a register file 34, a data transfer block 35, and an interrupt register (REG) 36. The instruction decode part 32 has an additional instruction decoder 42.

A processor that receives interrupt signals generated inside of and outside a chip including a semiconductor processing device has been known. The processor 31 branches to an interrupt handler and performs interrupt processing in response to an interrupt signal and returns to perform the original processing by a return (RETI) instruction when the interrupt processing is completed. An interrupt signal has a multi-interrupt structure in which interrupt numbers are allocated in accordance with priority of execution. When receiving an interrupt signal with higher priority while performing interrupt processing, the processor 31 aborts the interrupt processing and performs the interrupt processing with higher priority and returns to the aborted interrupt processing when the interrupt processing with higher priority is completed. The interrupt REG 36 is a register that retains an interrupt number and retains an interrupt number from when the processor 31 branches to the interrupt handler until the processor 31 returns to the original processing by the RETI instruction.

Figure 3:
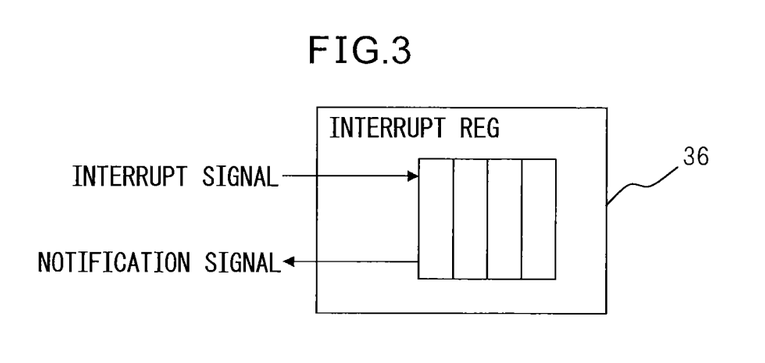
FIG. 3 is a diagram illustrating a configuration of the interrupt register (REG).

FIG. 3 is a diagram illustrating a configuration of the interrupt register (REG) 36. In order to retain the multi-interrupt numbers in accordance with priority as described above, the interrupt REG 36 has a stacked structure and outputs a notification signal in accordance with the retained interrupt number.

Returning to FIG. 2, the instruction decode part 32 fetches an instruction read from the instruction memory 21, decodes the fetched instruction, and generates an instruction operation control signal (opcode) for execution in the arithmetic unit 33 or the specific processing arithmetic unit 23. When the decoded instruction is a general instruction to be executed in the arithmetic unit 33, the generated opcode is output to the arithmetic unit 33 and when the decoded instruction is an additional instruction to be executed in the specific processing arithmetic unit 23, the generated opcode is output to the specific processing arithmetic unit 23. Determination of whether or not the instruction is an additional instruction is made by individually decoding the instruction for each interrupt number within the additional instruction decoder 42 using a notification signal indicating the interrupt number from the interrupt REG 36. Further, the additional instruction decoder 42 switches the instruction code maps in accordance with the interrupt number.

The instruction decode part 32 outputs the opcode to the arithmetic unit 13 or to the specific processing arithmetic unit 23 and at the same time, sends information of data for execution of the instruction to the data transfer block 35. The data transfer block 35 reads data for executing the instruction from the data memory 22 and stores the data in the register file 34. The arithmetic unit 33 processes the data stored in the register file 34 in accordance with the opcode and stores data of the processing result in the register file 34. The data transfer block 35 reads the data of the processing result from the register file 34 and stores the data in the data memory 22.

As described above, the configuration and operation of the computer of the first embodiment are the same as those of the general computer explained in FIG. 1 except in that the interrupt REG 36 receives an interrupt signal and the additional instruction decoder 42 is controlled in accordance with the reception state of the interrupt signal in the interrupt REG 36.

FIG. 4A to FIG. 4D are each a diagram illustrating an instruction decode map in the instruction decode part 32 and illustrate the change of the opcodes in the additional instruction regions in correspondence to the interrupt numbers 1 to 4.

The interrupt signal of the interrupt number 1 starts a timer processing handler, the interrupt signal of the interrupt number 2 starts a clock processing handler, the interrupt signal of the interrupt number 3 starts a watchdog reset processing handler, and the interrupt signal of the interrupt number 4 starts a DMA transfer handler.

Figure 4A:
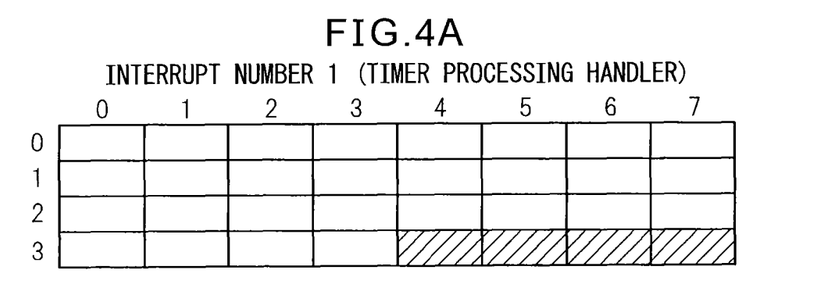
FIG. 4A to FIG. 4D are each a diagram illustrating an instruction decode map in the instruction decode part and illustrate the change of the opcodes in the additional instruction regions in correspondence to the interrupt numbers 1 to 4.
Figure 4B:
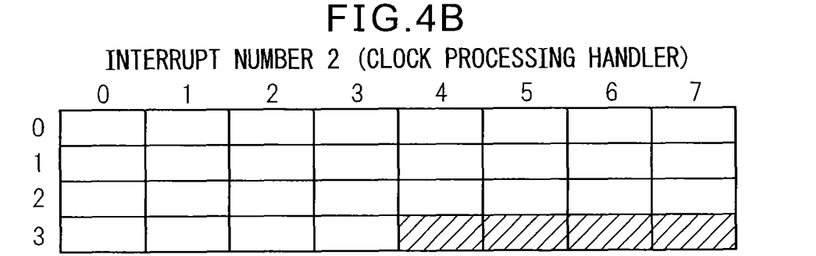
Figure 4C:
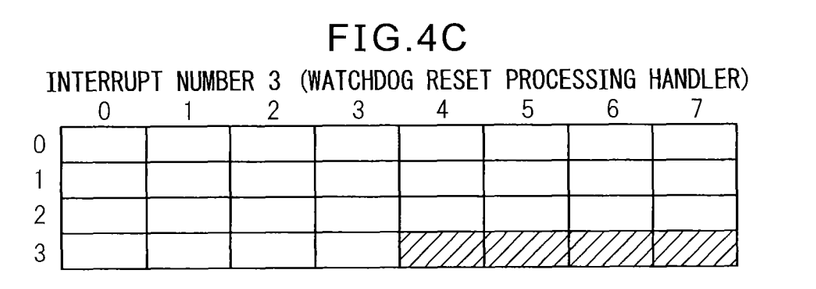
Figure 4D:
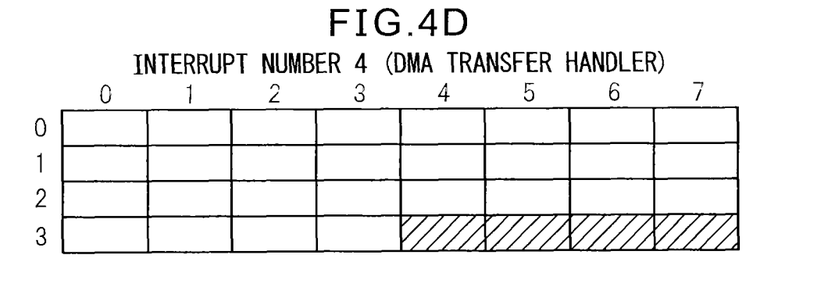

When performing processing in the timer processing handler, the interrupt signal of the interrupt number 1 is input to the processor 31. In response to this, the instruction decode map is switched to another so that the four instructions in the second half in the fourth row correspond to additional instructions used in the processing in the timer processing handler. While the timer processing handler is in operation after the interrupt signal of the interrupt number 1 is input, the additional instruction decoder 42 outputs the opcode specified in the instruction decode map in FIG. 4A when the four instruction codes in the second half in the fourth row of the instruction decode map are input. Similarly, while the clock processing handler is in operation after the interrupt signal of the interrupt number 2 is input, the additional instruction decoder 42 outputs the opcode specified in the instruction decode map in FIG. 4B when the four instruction codes in the second half in the fourth row of the instruction decode map are input. While the watchdog reset processing handler or the DMA transfer handler is in operation after the interrupt signal of the interrupt number 3 or the interrupt number 4 is input, the opcode specified in the instruction decode map in FIG. 4C or FIG. 4D is output. When instructions in the regions other than additional instruction regions of the instruction decode map, that is, 24 instructions in the first to third rows and four instructions in the first half in the fourth row in FIG. 4A to FIG. 4D are input, the same opcode corresponding to each region is output regardless of the input of the interrupt signal.

As described above, the 28 instruction regions of the 32 instruction regions in the instruction decode map are the normal instruction regions and the four regions are the additional instruction regions, and the four additional instruction regions are made different additional instruction regions for each interrupt number, and therefore, 16 additional instructions are implemented in total. Consequently, compared to the example in FIG. 1B, the number of normal instructions that are implemented increases by four and that of additional instructions by eight.

As described previously, a semiconductor processing device that mounts a processor to which an application-specific instruction is added is used, however, the analysis of the user applications has made clear that the additional instruction is used in correspondence to the interrupt processing in many cases. As a result, even if the additional instructions corresponding to the additional instruction region are switched to another in accordance with the kind of interrupt signals as in the first embodiment, no problem arises practically. In other words, no problem arises even if the additional instruction is made to be used only in specific interrupt processing. Further, in the first embodiment, only the interrupt signal that starts the interrupt handler is input and a signal to instruct to switch the additional instruction regions in the instruction decode map is not added or input, and therefore, the increases of the number of signals and the number of steps are suppressed. The same instruction may be separately specified as an additional instruction in different interrupt processing.

Figure 5:
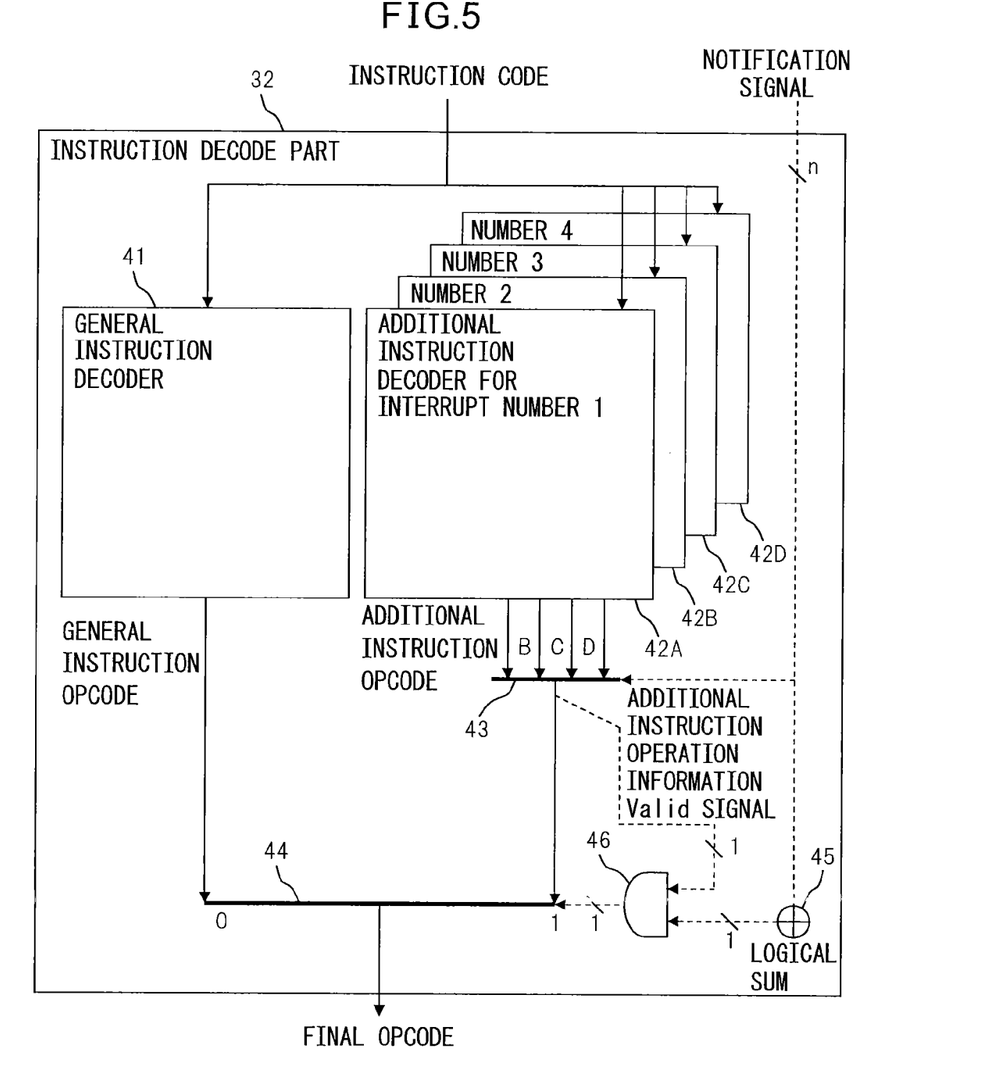
FIG. 5 is a diagram illustrating a configuration of the instruction decode part in the computer of the first embodiment.

FIG. 5 is a diagram illustrating a configuration of the instruction decode part 32 in the computer of the first embodiment.

As illustrated in FIG. 5, the instruction decode part 32 has a general instruction decoder 41, additional instruction decoders 42A to 42D, an additional instruction opcode selection circuit 43, a final selection circuit 44, an OR gate 45, and an AND gate 46.

The general instruction decoder 41 decodes a general instructions other than additional instructions and outputs general opcodes.

The additional instruction decoders 42A to 42D each decode additional instructions and output additional instruction opcodes corresponding to the interrupt number. For example, the additional instruction decoder 42A outputs an opcode corresponding to the instruction code in the additional instruction region of the interrupt number 1 in FIG. 4(A). Similarly, the additional instruction decoders 42B to 42D output opcodes corresponding to the additional instruction regions in FIG. 4(B) to 4(D). Each of the additional instruction decoders 42A to 42D decodes the additional instruction and at the same time, generates a Valid signal indicating that decoding has succeeded and outputs the Valid signal together with the additional instruction opcode. If, the additional instruction is not in the valid region and is not decoded, i.e., an NOP (No Operation) is decoded, the Valid signal is negated.

The additional instruction opcode selection circuit 43 selects the additional instruction opcodes output from the additional instruction decoders 42A to 42D in accordance with the notification signals output from the interrupt REG 36. For example, when the notification signal indicates the interrupt signal 1, the additional instruction opcode selection circuit 43 selects the output of the additional instruction decoder 42A. Similarly, when the notification signal indicates the interrupt signal 2, 3, or 4, the additional instruction opcode selection circuit 43 selects the additional instruction opcode output from the additional instruction decoder 42B, 42C, or 42D. Further, the additional instruction opcode selection circuit 43 calculates the logical sum of the Valid signals output from the additional instruction decoders 42A to 42D and when the Valid signal output from any of the additional instruction decoders 42A to 42D is valid, outputs "1" or outputs "0" otherwise.

The OR gate 45 calculates the logical sum of the notification signals. The calculation result is "1" when any of the interrupt handlers is started or "0" when none of the interrupt handlers is started. The AND gate calculates the logical product of the Valid signal and the OR gate 45. The calculation result is "1" when any of the interrupt handlers is started and the additional instruction is decoded validly or "0" otherwise.

The final selection circuit 44 selects the general opcode output from the general instruction decoder 41 when the output of the AND gate is "0" or selects the additional instruction opcode output from the additional instruction opcode selection circuit 43 when the output of the AND gate 41 is "1".

Figure 6:
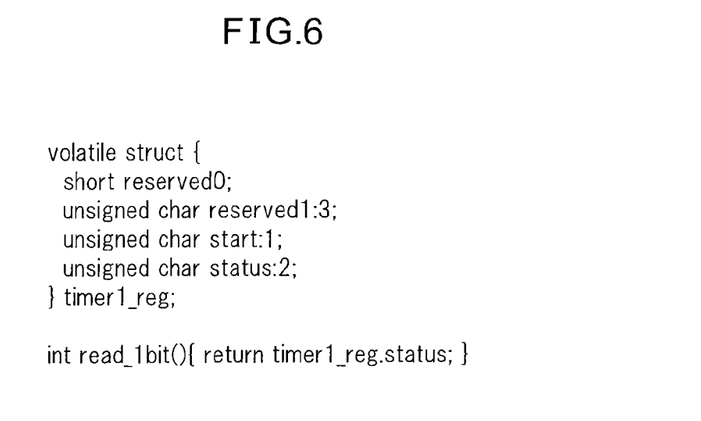
FIG. 6 is a diagram illustrating a program example of interrupt processing that uses an additional instruction.

FIG. 6 is a diagram illustrating a program example of interrupt processing that uses an additional instruction. The interrupt processing is timer processing. In this program, even the contents that are specified explicitly in the general instruction may be incorporated in advance as decode information without the need to define processing in the instruction code if the processing is explicit for each interrupt handler. As a result, the instruction code size is minimized. In this example, a timer control register is used, however, this is the same also in the case where a watchdog timer control register is used. Further, the two control registers are independent of each other when access is made in the respective dedicated interrupt processing handlers. Therefore, the same instruction code may be used to read the respective status registers, and therefore, the instruction code size is not increased.

Figure 7:
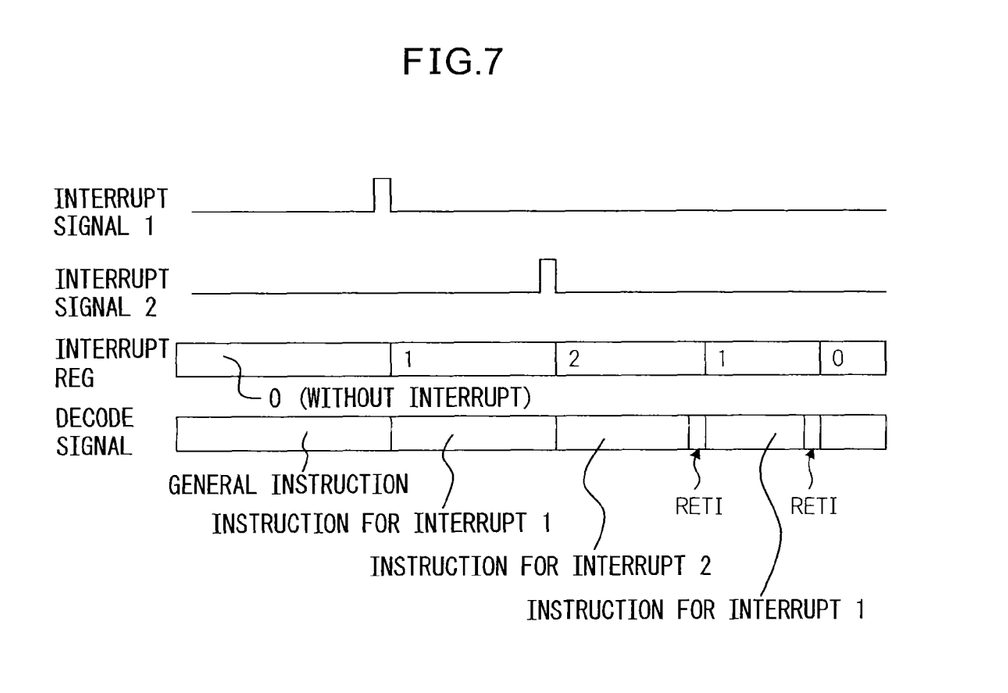
FIG. 7 is a time chart illustrating timings at which interrupt signals are input to the processor and the additional instruction decoders are switched.

FIG. 7 is a flowchart illustrating a timing at which interrupt signals are input to the processor 31 and the additional instruction decoders 42A to 42D switch. As illustrated in FIG. 7, the interrupt signal 1 is input in the state where no interrupt is input, and therefore, the notification signal output from the interrupt REG 36 is "1" and if an additional instruction is input, a state is brought about where the additional opcode output from the additional instruction decoder 42A is selected. When the fetched instruction code is not in the additional instruction region, the general instruction is selected. If the interrupt signal 2 with higher priority is input during the period of processing of the interrupt handler corresponding to the interrupt signal 1, the processor 31 moves the control to the interrupt processing with higher priority and at the time, the output of the interrupt REG 36 switches to "2". When the interrupt processing corresponding to the interrupt signal 2 is completed and the return instruction (RETI) signal is output, the control of the interrupt processing moves to the interrupt handler corresponding to the interrupt signal 1 that is put on hold.

The additional instruction illustrated as an example in the first embodiment is taken to be a calculation instruction for simplicity. However, the additional instruction is not limited to the calculation instruction, and the additional instruction may be a load/store, or branch instruction.

Further, in the first embodiment, the processor may switch pages of the instruction space by register write access to the interrupt REG or by causing delay interrupt by software in order to switch the pages of the instruction space upon receipt of an interrupt number.

In the first embodiment, the interrupt processing handler is started by an interrupt signal and the instruction is read sequentially from the memory 21 and interrupt processing is performed. In contrast to this, in a second embodiment to be explained next, part of a series of instruction sequences describing processing performed in the interrupt processing is stored in a processor and when the interrupt processing handler is started, the interrupt processing is performed by utilizing the instruction sequence stored within the processor. The instruction sequence stored within the processor is a series of instructions started by an additional instruction.

Figure 8:
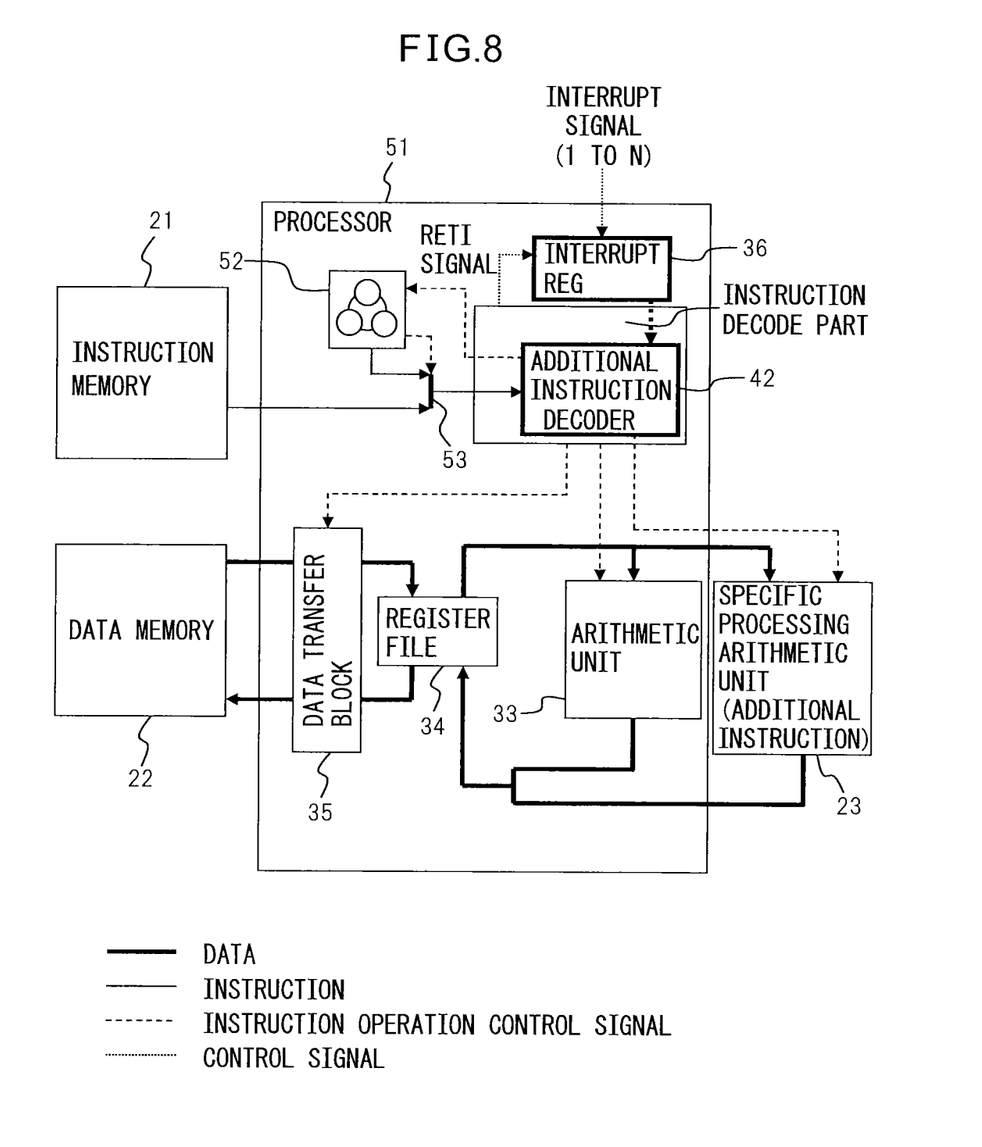
FIG. 8 is a configuration diagram of an outline of hardware of a computer of the second embodiment.

FIG. 8 is a configuration diagram of an outline of hardware of a computer of the second embodiment.

The computer of the second embodiment differs from that of the first embodiment in having a sequencer 52 and an instruction selection circuit 53 within a processor 51 and other parts are the same. The sequencer 52 stores part of a series of instruction sequences describing processing performed in the interrupt processing and the instruction sequence is started by an additional instruction. The instruction selection circuit 53 selects an instruction output from the sequencer 52 when the instruction is output from the sequencer 52 and selects an instruction read from the instruction memory 21 in other cases.

In the second embodiment, the processor 51 reads an instruction from the instruction memory 21 and performs normal processing in the state where no interrupt handler is started. When an interrupt signal is input, the additional instruction region of the instruction decode map is switched to another in accordance with the kind of the interrupt signal as in the first embodiment. When the additional instruction fetched from the instruction memory 21 is the additional instruction that starts the instruction sequence stored in the sequencer 52, the interrupt processing is performed in accordance with the instruction output from the sequencer 52. When the additional instruction fetched from the instruction memory 21 is not the additional instruction that starts the instruction sequence stored in the sequencer 52, the same interrupt processing as that in the first embodiment is performed.

Although the first and second embodiments are explained, there may be various modified examples. For example, in the first and second embodiments, explanation is given with the case as an example, where the specific processing arithmetic unit 23 that executes an additional instruction is connected and the additional instruction region of the instruction decode map is switched to another in accordance with the kind of the interrupt signal. However, the configuration of the first and second embodiments may be similarly applied to the case where the specific processing arithmetic unit 23 is not connected. For example, regions corresponding to the additional instruction regions of the instruction decode map are taken to be switch regions and the instruction in the switch region is switched to an instruction corresponding to the kind of the interrupt processing in accordance with the kind of the interrupt signal. In this case also, it is possible to make use of an instruction desired by a user in the actual use by switching an instruction corresponding to the switch region to a special additional instruction suitable for the interrupt processing in accordance with the kind of the interrupt signal without an increase in the number of signals and in the number of steps.

According to an embodiment, a processor capable of increasing the number of executable instructions in a form suitable to an actual use is realized by utilizing functions possessed by the processor.

All examples and conditional language provided herein are intended for pedagogical purposes of aiding the reader in understanding the invention and the concepts contributed by the inventor to furthering the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
an arithmetic unit configured to execute instructions;
an instruction decode part configured to decode the instructions executed in the arithmetic unit and to output opcodes;
an interrupt register configured to receive an interrupt signal; and
a sequencer configured to store a series of instructions to be processed by continuous instructions included in the instructions, wherein the sequencer outputs the series of instructions to the instruction decode part in response to the instruction decode part detecting the continuous instructions,
wherein the instruction decode part comprises an instruction code map that is configured to store the opcodes in correspondence to instructions and to output the opcodes in accordance with the instructions inputted, and
the instruction code map is further configured to store a plurality of opcodes to be output to a second arithmetic unit as switch opcodes corresponding to additional instructions, the additional instructions being a part of the instructions, and to switch the plurality of the switch opcodes in accordance with the interrupt signal.

2. The processor according to claim 1, wherein the instruction decode part further comprises:
a general instruction decoder configured to decode general instructions except the additional instructions and to output general opcodes,
a plurality of additional instruction decoders corresponding to the additional instructions, the plurality of additional instruction decoders being configured to decode the additional instructions and to output additional opcodes,
an opcode selection circuit configured to select the additional opcodes output from the plurality of additional instruction decoders in accordance with data of the interrupt register, and
a final selection circuit configured to select one of the general opcode output from the general instruction decoder and the additional opcodes output from the opcode selection circuit.

3. The processor according to claim 1, wherein
the interrupt signal has a multi-interrupt relationship, and
the interrupt register has a stacked structure.

4. The processor according to claim 2, wherein
the interrupt signal has a multi-interrupt relationship, and
the interrupt register has a stacked structure.

5. A processor comprising:

an arithmetic unit configured to execute instructions;

an instruction decode part configured to decode the instructions executed in the arithmetic unit and to output opcodes;

an interrupt register configured to receive an interrupt signal; and a sequencer configured to store a series of instructions to be processed by continuous instructions included in the instructions, wherein the sequencer outputs the series of instructions to the instruction decode part in response to the instruction decode part detecting the continuous instructions, and wherein the instruction decode part comprises an instruction code map that is configured to store the opcodes in correspondence to instructions and to output the opcodes in accordance with the instructions inputted, and wherein the instruction code map is further configured to store a plurality of opcodes to be output as switch opcodes corresponding to additional instructions, the additional instructions being a part of the instructions, and to switch the plurality of the switch opcodes in accordance with the interrupt signal.

6. The processor according to claim 5, wherein the interrupt signal has a multi-interrupt relationship, and the interrupt register has a stacked structure.

7. The processor according to claim 5, wherein the instruction decode part comprises:

a general instruction decoder configured to decode general instructions except the additional instructions and to output general opcodes;

a plurality of additional instruction decoders corresponding to the additional instructions, the plurality of additional instruction decoders being configured to decode the additional instructions and to output additional opcodes;

an opcode selection circuit configured to select the additional opcodes output from the plurality of additional instruction decoders in accordance with data of the interrupt register; and a final selection circuit configured to select one of the general opcode output from the general instruction decoder and the additional opcodes output from the opcode selection circuit.

8. The processor according to claim 7, wherein the interrupt signal has a multi-interrupt relationship, and the interrupt register has a stacked structure.

* * * * *